United States Patent
Tian et al.

(10) Patent No.: US 12,131,866 B2
(45) Date of Patent: Oct. 29, 2024

(54) METHOD FOR PREPARING SUPERCAPACITOR WITH GOOD CYCLING STABILITY

(71) Applicant: CHONGQING UNIVERSITY OF ARTS AND SCIENCES, Chongqing (CN)

(72) Inventors: Liangliang Tian, Chongqing (CN); Hanwen Ou, Chongqing (CN); Wenyao Yang, Chongqing (CN); Yi Wang, Chongqing (CN)

(73) Assignee: CHONGQING UNIVERSITY OF ARTS AND SCIENCES, Chongqing (CN)

( * ) Notice: Subject to any disclaimer, the term of this patent is extended or adjusted under 35 U.S.C. 154(b) by 0 days.

(21) Appl. No.: 18/532,830

(22) Filed: Dec. 7, 2023

(65) Prior Publication Data

US 2024/0105397 A1 Mar. 28, 2024

Related U.S. Application Data

(63) Continuation of application No. PCT/CN2022/099946, filed on Jun. 20, 2022.

(30) Foreign Application Priority Data

Jun. 22, 2021 (CN) .......................... 202110693295.5

(51) Int. Cl.
*H01G 7/00* (2006.01)
*H01G 11/34* (2013.01)
(Continued)

(52) U.S. Cl.
CPC ............. *H01G 11/86* (2013.01); *H01G 11/34* (2013.01); *H01G 11/46* (2013.01)

(58) Field of Classification Search
CPC ......... H01G 11/34; H01G 11/46; H01G 11/86
See application file for complete search history.

(56) References Cited

U.S. PATENT DOCUMENTS 11,735,719 B2 * 8/2023 Ossonon ................ H01G 11/86
429/224

FOREIGN PATENT DOCUMENTS

CN    110364709 A    10/2019
CN    110828789 A    2/2020
(Continued)

*Primary Examiner* — Paul D Kim
(74) *Attorney, Agent, or Firm* — PORUS IP LLC

(57) ABSTRACT

A method for preparing a supercapacitor with good cycling stability uses NiO@CoMoO$_4$/NF, an activated carbon plate, a KOH solution (6 mol/L), and polypropylene as raw materials, and is implemented through preparation of an NiO@CoMoO$_4$/NF electrode and assembly of the supercapacitor, wherein the NiO@CoMoO$_4$/NF is the anode of the supercapacitor, the activated carbon plate is the cathode of the supercapacitor, the KOH solution is the electrolyte, and the polypropylene is an isolation plate. The NiO@CoMoO$_4$/NF electrode in the supercapacitor of the present disclosure treated with the ductile material can better adapt to volume changes during the charging and discharging process. After 10,000 cycles of charging and discharging, the capacity of the present disclosure has not faded and still maintains 100% of the maximum capacity, with a high specific capacitance of 79.4 F/g, an energy density of 35.7 Wh/kg, and a functional density of 899.5 W/kg.

2 Claims, 5 Drawing Sheets

(51) Int. Cl.
*H01G 11/46* (2013.01)
*H01G 11/86* (2013.01)

(56) References Cited

FOREIGN PATENT DOCUMENTS

| | | | |
|---|---|---|---|
| CN | 111403705 A | | 7/2020 |
| CN | 115404511 A | * | 11/2022 |
| CN | 115679364 A | * | 2/2023 |
| CN | 117181241 A | * | 12/2023 |
| JP | 2011175747 A | | 9/2011 |
| JP | 2012054000 A | | 3/2012 |
| JP | 2013012394 A | | 1/2013 |

* cited by examiner

METHOD FOR PREPARING SUPERCAPACITOR WITH GOOD CYCLING STABILITY

CROSS-REFERENCE TO RELATED APPLICATIONS

This application is a continuation of International Application No. PCT/CN2022/099946, filed on Jun. 20, 2022, which claims priority to Chinese Patent Application No. 202110693295.5, filed on Jun. 22, 2021. All of the aforementioned applications are incorporated herein by reference in their entireties.

TECHNICAL FIELD

The present disclosure relates to a method for preparing a supercapacitor with good cycling stability.

BACKGROUND

Supercapacitors, also known as electrochemical capacitors, are a type of electrochemical components developed in the 1970s and 1980s for storing energy by polarizing electrolytes. Transition metal oxides, as electrode materials of supercapacitors, have been widely studied for their high theoretical specific capacitance, abundant earth resources, low cost, no environmental pollution, etc. However, the specific capacitance and experimental values obtained by the transition metal oxides are far lower than theoretical values. On the other hand, during the charging and discharging process of transition metal oxide electrodes, due to changes in the volume of the electrodes, their own structure will be damaged, ultimately leading to a decrease in the energy storage performance and less ideal cycling stability of supercapacitors after multiple times of charging and discharging. In addition, since the electrodes are in the electrolyte which has certain corrosiveness for a long time, the electrode structure may be damaged, ultimately leading to a decrease in the charging and discharging performance and a shortened service life.

SUMMARY

The objective of the present disclosure is to provide a method for preparing a supercapacitor with good cycling stability.

The present disclosure is implemented through the following technical solutions.

The method for preparing a supercapacitor with good cycling stability uses NiO@CoMoO$_4$/NF, an activated carbon plate, a KOH solution (6 mol/L), and polypropylene as raw materials, and is implemented through preparation of an NiO@CoMoO$_4$/NF electrode and assembly of the supercapacitor, wherein the NiO@CoMoO$_4$/NF is the anode of the supercapacitor, the activated carbon plate is the cathode of the supercapacitor, the KOH solution is the electrolyte, the polypropylene is an isolation plate, and the NF in the NiO@CoMoO$_4$/NF is nickel foam.

To fully enhance the electrochemical performance of the electrode, the NiO@CoMoO$_4$/NF electrodes is prepared by the following steps.

(1) NF is soaked in a hydrochloric acid solution (2.5-3.0 mol/L) for 5-10 min and then taken out. The NF is cleaned with deionized water to eliminate surface impurities, dried in an environment of 55-60° C. for 12-16 h, and then taken out. Then, the treated NF is soaked in deionized water and transferred into a stainless steel high-pressure reactor, the mass ratio of the NF to the deionized water being 1:(700-900). Then, the NF is insulated at a constant temperature of 140-150° C. for 24-28 h, cooled naturally to room temperature, and taken out. The NF is cleaned with deionized water 3-5 times, and dried in a vacuum drying oven at a vacuum degree of −0.05 to −0.08 MPa and a temperature of 55-65° C. for 20-26 h. After being dried, the NF is placed in a quartz tube furnace, heated up to 400-450° C. at a heating rate of 0.5-0.8° C./min, and insulated for 2-3 h to obtain NiO sheet/NF, the NF being nickel foam.

(2) 65.1 parts by mass of CoCl$_2$·6H$_2$O and 50.8 parts by mass of Na$_2$MoO$_4$·2H$_2$O are fully dissolved in 2000-2500 parts by mass of deionized water. Then, the NiO sheet/NF prepared in step (1) is soaked in the resulting solution and stirred for 30-50 min. After stirring, the NiO sheet/NF is transferred into a stainless steel reactor, insulated at 160-170° C. for 6-8 h, cooled to room temperature and taken out. The NiO sheet/NF is soaked in deionized water and ultrasonically cleaned for 3-5 min. Then, the NiO sheet/NF is dried in a vacuum drying oven at a vacuum degree of −0.05 to −0.08 MPa and a temperature of 55-65° C. for 12-15 h, and taken out to obtain an NiO sheet@CoMoO$_4$ nanosheet/NF precursor. Then, the NiO sheet@CoMoO$_4$ nanosheet/NF precursor is placed in a quartz tube furnace, heated up to 400-420° C. at a heating rate of 0.5-0.8° C./min, and insulated for 2 h to obtain the NiO@CoMoO$_4$/NF electrode.

The CoMoO$_4$ nanosheets in the NiO@CoMoO$_4$/NF electrode are uniformly and vertically grown on the surface of the NiO nanosheets, forming a core-shell structure of sheets. The structure can provide a sufficient contact area between the electrolyte and the electrode to provide sufficient electrochemical active sites. Also, the structure improves the electron reception efficiency and achieves a high electron transfer rate, ensuring the electron transfer kinetic advantages. On the other hand, diffusion channels formed by the interaction of the CoMoO$_4$ nanosheets can promote diffusion of the electrolyte, which is more conducive to utilization of the core-shell material. In addition, the abundantly porous structure can provide a stress release space for the electrode material during the charging and discharging process to ensure stability of the electrode.

In order to solve the technical problems of the electrode structure being damaged due to changes in the electrode volume during multiple times of charging and discharging, or the electrode being corroded and damaged due to long-time contact between the electrode and the electrolyte, which ultimately leads to a decrease in the energy storage performance and a shortened service life, the NiO@CoMoO$_4$/NF electrode is further soaked in a ductile material, wherein the ductile material is composed of a carbon powder, sodium carboxymethyl cellulose, styrene-butadiene rubber, a metal powder and deionized water in a mass ratio of (2-6):(3-8):(20-28):(0.9-1.5):(30-50), the particle size of the carbon powder is 10-50 μm, and the metal powder is an iron powder or a copper powder, with a particle size of 10-50 μm.

Furthermore, the ductile material is prepared by the following steps. The deionized water is heated to 50-60° C. The sodium carboxymethyl cellulose is added while stirring, dispersed uniformly and allowed to stand for 1-2 h to obtain a sodium carboxymethyl cellulose solution for later use. The styrene-butadiene rubber is heated to 70-90° C. The sodium carboxymethyl cellulose solution is added while stirring and stirred for 30-50 min. The carbon powder and the iron powder are added in sequence, stirred for 20-30 min and insulated for later use, the stirring speed being 20-50 r/min.

Furthermore, the NiO@CoMoO$_4$/NF electrode is further soaked in the ductile material. Specifically, the NiO@CoMoO$_4$/NF electrode is soaked in the ductile material, allowed to stand at 70-90° C. for 2-3 h, and then taken out and dried in a blast drying oven at 40-45° C. for 8-10 h. The unique bonding performance of the sodium carboxymethyl cellulose makes the ductile material firmly cover the surface of the NiO@CoMoO$_4$/NF electrode. On the one hand, the combination of the styrene-butadiene rubber and the sodium carboxymethyl cellulose can make the NiO@CoMoO$_4$/NF electrode more resilient and more adaptable to volume changes during charging and discharging processes, ensuring that the core-shell structure is not damaged. On the other hand, the styrene-butadiene rubber and the sodium carboxymethyl cellulose can form a thin film on the surface of the NiO@CoMoO$_4$/NF electrode to prevent corrosion and damage of the electrode from the electrolyte, ultimately ensuring that the charging and discharging performance does not decrease during multiple times of charging and discharging, and ensuring good cycling stability.

Furthermore, the supercapacitor is assembled by pressing the NiO@CoMoO$_4$/NF treated with the ductile material, the polypropylene and the activated carbon plate together according to the same size, and using the KOH solution (6 mol/L) as the electrolyte.

The present disclosure has the following beneficial effects.

The supercapacitor of the present disclosure uses the NiO@CoMoO$_4$/NF as the electrode, and the CoMoO$_4$ nanosheets are uniformly and vertically grown on the surface of the NiO nanosheets, forming a core-shell structure of sheets. The 2D branched core-shell structure can provide a sufficient contact area between the electrolyte and the electrode to provide sufficient electrochemical active sites. The 2D characteristic of the NiO sheets and the CoMoO$_4$ nanosheets improves the electron reception efficiency and achieves a high electron transfer rate, ensuring the electron transfer kinetic advantages. The abundantly porous structure can provide a stress release space for the electrode material during the charging and discharging process to ensure good stability in repeated charging and discharging. The NiO@CoMoO$_4$/NF electrode treated with the ductile material can better adapt to volume changes during the charging and discharging process, while also preventing the corrosion from the electrolyte, ultimately resulting in good cycling stability of a product. After 10,000 cycles of charging and discharging, the capacity of the present disclosure has not faded and still maintains 100% of the maximum capacity, with a high specific capacitance of 79.4 F/g, an energy density of 35.7 Wh/kg, and a functional density of 899.5 W/kg. Therefore, the present disclosure has excellent electrochemical energy storage performance and worth of market promotion.

DETAILED DESCRIPTION OF THE EMBODIMENTS

Figure 1:
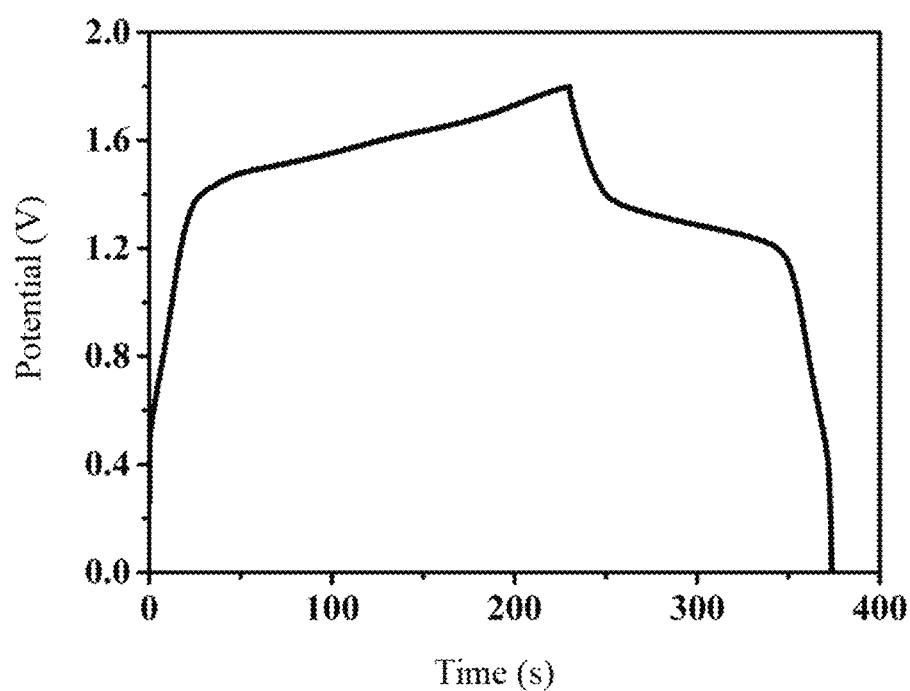
FIG. 1 is a map showing measurements of the mass specific capacitance of a product prepared in Example 1.

The present disclosure will be further described in detail through examples and in conjunction with the accompanying drawings.

Example 1

A supercapacitor with good cycling stability was prepared by the following steps.

1. Preparation of an NiO@CoMoO$_4$/NF electrode:

(1) NF (nickel foam, 1.5 cm*3.5 cm) was soaked in a hydrochloric acid solution (2.8 mol/L) for 8 min and then taken out. The NF was cleaned with deionized water to eliminate surface impurities, dried in an environment of 60° C. for 15 h, and then taken out. Then, the treated NF was soaked in deionized water and transferred into a stainless steel high-pressure reactor, the mass ratio of the NF (nickel foam) to the deionized water being 1:800. Then, the NF was insulated at a constant temperature of 140° C. for 26 h, cooled naturally to room temperature, and taken out. The NF was cleaned with deionized water 5 times, and dried in a vacuum drying oven at a vacuum degree of −0.08 MPa and a temperature of 55° C. for 22 h. After being dried, the NF was placed in a quartz tube furnace, heated up to 420° C. at a heating rate of 0.6° C./min, and insulated for 2.5 h to obtain NiO sheet/NF.

(2) 65.1 mg of CoCl$_2$·6H$_2$O and 50.8 mg of Na$_2$MoO$_4$·2H$_2$O were fully dissolved in 22 ml of deionized water. Then, the NiO sheet/NF prepared in step (1) was soaked in the resulting solution and stirred for 40 min. After stirring, the NiO sheet/NF was transferred into a stainless steel reactor, insulated at 165° C. for 7 h, cooled to room temperature and taken out. The NiO sheet/NF was soaked in deionized water and ultrasonically cleaned for 4 min. Then, the NiO sheet/NF was dried in a vacuum drying oven at a vacuum degree of −0.08 MPa and a temperature of 55° C. for 14 h, and taken out to obtain an NiO sheet@CoMoO$_4$ nanosheet/NF precursor. Then, the NiO sheet@CoMoO$_4$ nanosheet/NF precursor was placed in a quartz tube furnace, heated up to 420° C. at a heating rate of 0.6° C./min, and insulated for 2 h to obtain the NiO@CoMoO$_4$/NF electrode.

2. Preparation of a ductile material: 40 g of deionized water was heated to 55° C. 5 g of sodium carboxymethyl cellulose was added while stirring, dispersed uniformly and allowed to stand for 1.5 h to obtain a sodium carboxymethyl cellulose solution for later use. 25 g of styrene-butadiene rubber was heated to 80° C. The sodium carboxymethyl cellulose solution was added while stirring and stirred for 40 min. Then, 5 g of carbon powder with a particle size of 10-50 μm and 1.2 g of iron powder with a particle size of 10-50 μm were added in sequence, stirred for 25 min and insulated for later use, the stirring speed being 40 r/min.

3. Treatment of the NiO@CoMoO$_4$/NF electrode: The NiO@CoMoO$_4$/NF electrode was soaked in the ductile material prepared in step 2, allowed to stand at 80° C. for 2.5 h, and then taken out and dried in a blast drying oven at 45° C. for 8 h.

4. Assembly of the supercapacitor: The NiO@CoMoO$_4$/NF treated with the ductile material, polypropylene and an activated carbon plate were cut in equal sizes of 1 cm*2 cm and then pressed together, and a KOH solution (6 mol/L) was used as the electrolyte to assemble the supercapacitor.

Experiment 1: Measurement of Mass Specific Capacitance

The mass specific capacitance of the supercapacitor prepared in Example 1 was measured, and the results are as follows.

The experimental results show that the specific capacitance is as high as 79.4 F/g, the energy density is 35.7 Wh/kg, and the functional density is 899.5 W/kg. The specific results are shown in FIG. 1.

Experiment 2: Measurement of Cycling Stability of Charging and Discharging

Figure 2:
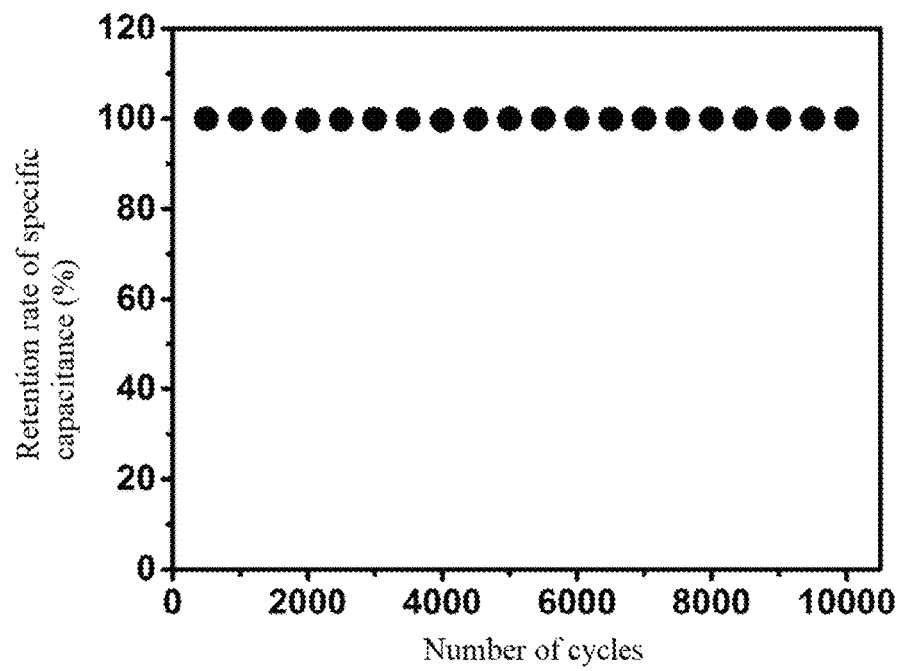
FIG. 2 is a map showing the cycling stability of charging and discharging of the product prepared in Example 1.

A 1 cm*1 cm electrode was prepared by cutting and charged and discharged for 10,000 cycles at a current density of 10 A/g. The specific capacity was recorded and calculated every 500 cycles, and the experimental results are shown in FIG. 2.

The experimental results show that after 10,000 cycles, the capacity of the present disclosure has not faded and still maintains 100% of the maximum capacity.

Figure 3:
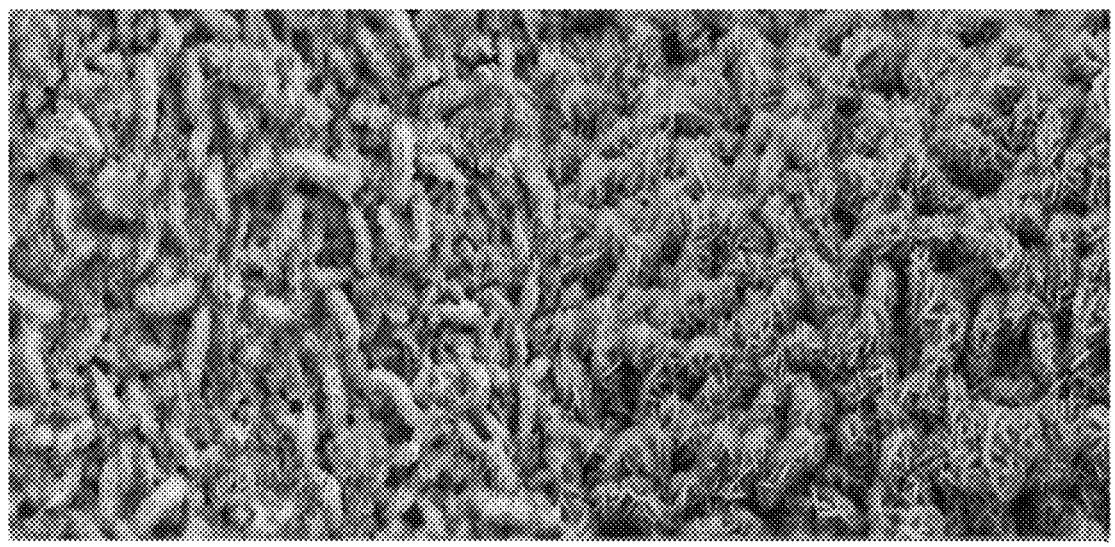
FIG. 3 shows SEM images of the electrode before and after 10,000 times of charging and discharging cycles of the product prepared in Example 1, indicating that the structure of the product does not collapse before and after the charging and discharging cycles.

Experiment 3: Comparison of Electron Micrographs Before and After the Measurement of Cycling Stability of Charging and Discharging Electron microscopic observation was performed on the electrode of the present disclosure before the charging and discharging cycles, and then performed again after 10,000 cycles of charging and discharging. The electron micrographs before and after the charging and discharging cycles are shown in FIG. 3.

As shown in the figure, the structure of the electrode of the supercapacitor of the present disclosure does not collapse before and after the charging and discharging cycles, indicating that the electrode of the supercapacitor of the present disclosure can adapt to volume changes during the charging and discharging process.

Experiment 4: Comparative Experiment

Comparative Experiment 1: A supercapacitor with good cycling stability was prepared by the method of Example 1, except that the electrode material was not treated with a ductile material. The specific steps are as follows.

1. Preparation of an NiO@CoMoO$_4$/NF electrode:

(1) NF (nickel foam, 1.5 cm*3.5 cm) was soaked in a hydrochloric acid solution (2.8 mol/L) for 8 min and then taken out. The NF was cleaned with deionized water to eliminate surface impurities, dried in an environment of 60° C. for 15 h, and then taken out. Then, the treated NF was soaked in deionized water and transferred into a stainless steel high-pressure reactor, the mass ratio of the NF (nickel foam) to the deionized water being 1:800. Then, the NF was insulated at a constant temperature of 140° C. for 26 h, cooled naturally to room temperature, and taken out. The NF was cleaned with deionized water 5 times, and dried in a vacuum drying oven at a vacuum degree of −0.08 MPa and a temperature of 55° C. for 22 h. After being dried, the NF was placed in a quartz tube furnace, heated up to 420° C. at a heating rate of 0.6° C./min, and insulated for 2.5 h to obtain NiO sheet/NF.

(2) 65.1 mg of CoCl$_2$·6H$_2$O and 50.8 mg of Na$_2$MoO$_4$·2H$_2$O were fully dissolved in 22 ml of deionized water. Then, the NiO sheet/NF prepared in step (1) was soaked in the resulting solution and stirred for 40 min. After stirring, the NiO sheet/NF was transferred into a stainless steel reactor, insulated at 165° C. for 7 h, cooled to room temperature and taken out. The NiO sheet/NF was soaked in deionized water and ultrasonically cleaned for 4 min. Then, the NiO sheet/NF was dried in a vacuum drying oven at a vacuum degree of −0.08 MPa and a temperature of 55° C. for 14 h, and taken out to obtain an NiO sheet@CoMoO$_4$ nanosheet/NF precursor. Then, the NiO sheet@CoMoO$_4$ nanosheet/NF precursor was placed in a quartz tube furnace, heated up to 420° C. at a heating rate of 0.6° C./min, and insulated for 2 h to obtain the NiO@CoMoO$_4$/NF electrode.

2. Assembly of the supercapacitor: The NiO@CoMoO$_4$/NF, polypropylene and an activated carbon plate were cut in equal sizes of 1 cm*2 cm and then pressed together, and a KOH solution (6 mol/L) was used as the electrolyte to assemble the supercapacitor.

(1) Measurement of Mass Specific Capacitance

The mass specific capacitance of the supercapacitor prepared in Comparative Experiment 1 was measured, and the results are as follows.

Figure 4:
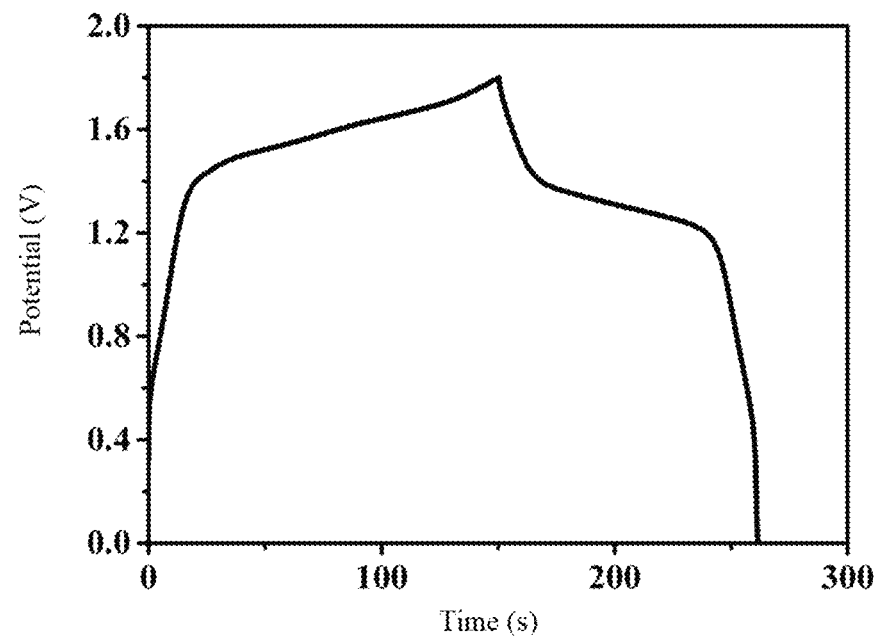
FIG. 4 is a map showing measurements of the mass specific capacitance of a product prepared in Example 2.

The experimental results show that the specific capacitance is as high as 60.9 F/g, the energy density is 27.4 Wh/kg, and the functional density is 888.6 W/kg. The specific results are shown in FIG. 4.

(2) Measurement of Cycling Stability of Charging and Discharging

Figure 5:
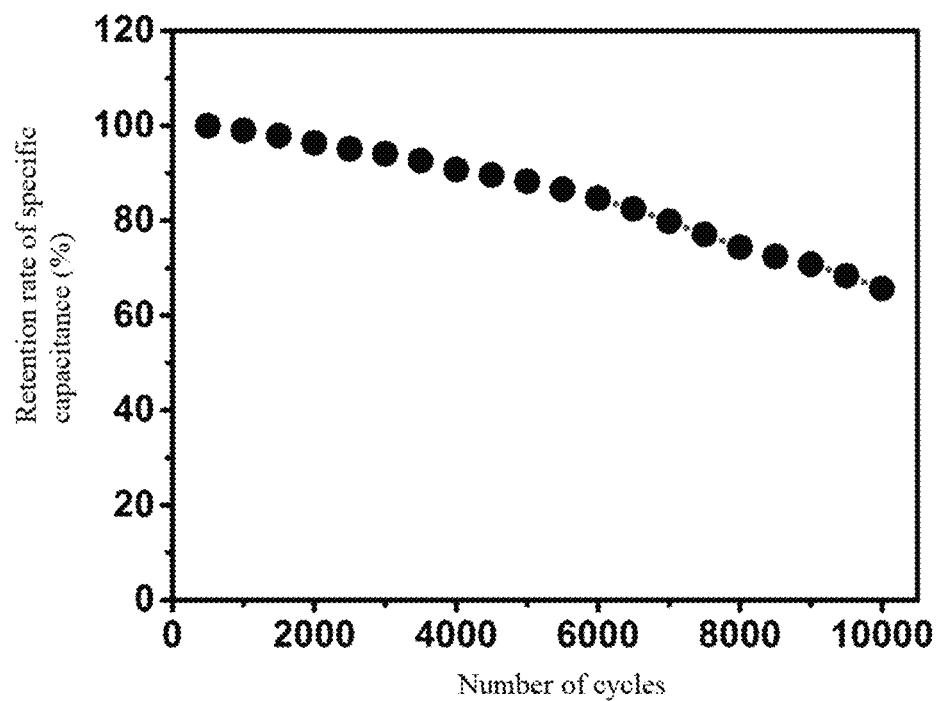
FIG. 5 is a map showing the cycling stability of charging and discharging of the product prepared in Example 2.

A 1 cm*1 cm electrode was prepared by cutting the product prepared in Comparative Experiment 1 and charged and discharged for 10,000 cycles at a current density of 10 A/g. The specific capacity was recorded and calculated every 500 cycles, and the experimental results are shown in FIG. 5.

The experimental results show that after 10,000 cycles, the capacity has faded to 65.7% of the maximum value.

Comparative Experiment 2: A supercapacitor with good cycling stability was prepared by the method of Example 1, except that sodium carboxymethyl cellulose was not added to a ductile material. The specific steps are as follows.

1. Preparation of an NiO@CoMoO$_4$/NF electrode:

(1) NF (nickel foam, 1.5 cm*3.5 cm) was soaked in a hydrochloric acid solution (2.8 mol/L) for 8 min and then taken out. The NF was cleaned with deionized water to eliminate surface impurities, dried in an environment of 60° C. for 15 h, and then taken out. Then, the treated NF was soaked in deionized water and transferred into a stainless steel high-pressure reactor, the mass ratio of the NF (nickel foam) to the deionized water being 1:800. Then, the NF was insulated at a constant temperature of 140° C. for 26 h, cooled naturally to room temperature, and taken out. The NF was cleaned with deionized water 5 times, and dried in a vacuum drying oven at a vacuum degree of −0.08 MPa and a temperature of 55° C. for 22 h. After being dried, the NF was placed in a quartz tube furnace, heated up to 420° C. at a heating rate of 0.6° C./min, and insulated for 2.5 h to obtain NiO sheet/NF.

(2) 65.1 mg of CoCl$_2$·6H$_2$O and 50.8 mg of Na$_2$MoO$_4$·2H$_2$O were fully dissolved in 22 ml of deionized water. Then, the NiO sheet/NF prepared in step (1) was soaked in the resulting solution and stirred for 40 min. After stirring, the NiO sheet/NF was transferred into a stainless steel reactor, insulated at 165° C. for 7 h, cooled to room temperature and taken out. The NiO sheet/NF was soaked in deionized water and ultrasonically cleaned for 4 min. Then, the NiO sheet/NF was dried in a vacuum drying oven at a vacuum degree of −0.08 MPa and a temperature of 55° C. for 14 h, and taken out to obtain an NiO sheet@$CoMoO_4$ nanosheet/NF precursor. Then, the NiO sheet@$CoMoO_4$ nanosheet/NF precursor was placed in a quartz tube furnace, heated up to 420° C. at a heating rate of 0.6° C./min, and insulated for 2 h to obtain the NiO@$CoMoO_4$/NF electrode.

2. Preparation of a ductile material: 25 g of styrene-butadiene rubber was heated to 80° C. 40 g of deionized water was added while stirring and stirred for 40 min. 5 g of carbon powder with a particle size of 10-50 μm and 1.2 g of iron powder with a particle size of 10-50 μm were added in sequence, stirred for 25 min and insulated for later use, the stirring speed being 40 r/min.

3. Treatment of the NiO@$CoMoO_4$/NF electrode: The NiO@$CoMoO_4$/NF electrode was soaked in the ductile material prepared in step 2, allowed to stand at 80° C. for 2.5 h, and then taken out and dried in a blast drying oven at 45° C. for 8 h.

4. Assembly of the supercapacitor: The NiO@$CoMoO_4$/NF treated with the ductile material, polypropylene and an activated carbon plate were cut in equal sizes of 1 cm*2 cm and then pressed together, and a KOH solution (6 mol/L) was used as the electrolyte to assemble the supercapacitor.
(1) Measurement of Mass Specific Capacitance The mass specific capacitance of the supercapacitor prepared in Comparative Experiment 2 was measured, and the results are as follows.

Figure 6:
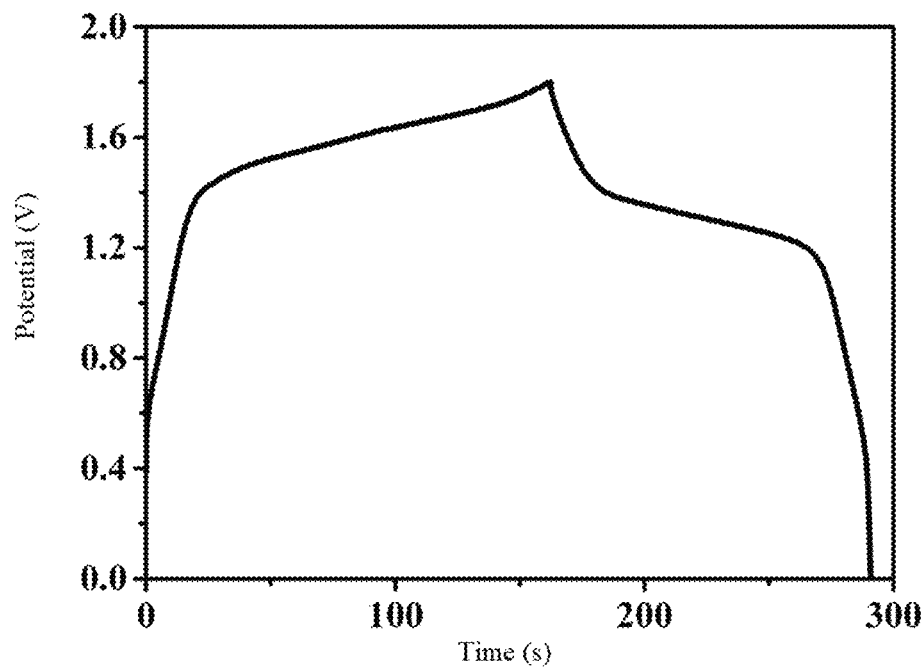
FIG. 6 is a map showing measurements of the mass specific capacitance of a product prepared in Example 3.

The experimental results show that the specific capacitance is as high as 71.6 F/g, the energy density is 32.2 Wh/kg, and the functional density is 899.2 W/kg. The specific results are shown in FIG. 6.

(2) Measurement of Cycling Stability of Charging and Discharging

Figure 7:
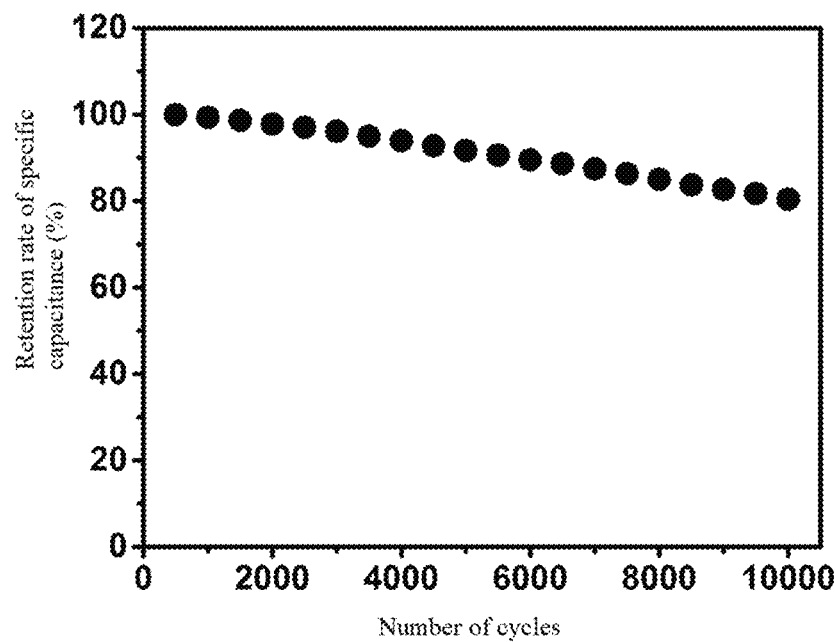
FIG. 7 is a map showing the cycling stability of charging and discharging of the product prepared in Example 3.

A 1 cm*1 cm electrode was prepared by cutting the product prepared in Example 2 and charged and discharged for 10,000 cycles at a current density of 10 A/g. The specific capacity was recorded and calculated every 500 cycles, and the experimental results are shown in FIG. 7.

The experimental results show that after 10,000 cycles, the capacity has faded to 80.4% of the maximum value.

Comparative Experiment 3: A supercapacitor with good cycling stability was prepared by the method of Example 1, except that styrene-butadiene rubber was not added to a ductile material. The specific steps are as follows.

1. Preparation of an NiO@$CoMoO_4$/NF electrode:
(1) NF (nickel foam, 1.5 cm*3.5 cm) was soaked in a hydrochloric acid solution (2.8 mol/L) for 8 min and then taken out. The NF was cleaned with deionized water to eliminate surface impurities, dried in an environment of 60° C. for 15 h, and then taken out. Then, the treated NF was soaked in deionized water and transferred into a stainless steel high-pressure reactor, the mass ratio of the NF (nickel foam) to the deionized water being 1:800. Then, the NF was insulated at a constant temperature of 140° C. for 26 h, cooled naturally to room temperature, and taken out. The NF was cleaned with deionized water 5 times, and dried in a vacuum drying oven at a vacuum degree of −0.08 MPa and a temperature of 55° C. for 22 h. After being dried, the NF was placed in a quartz tube furnace, heated up to 420° C. at a heating rate of 0.6° C./min, and insulated for 2.5 h to obtain NiO sheet/NF.

(2) 65.1 mg of $CoCl_2·6H_2O$ and 50.8 mg of $Na_2MoO_4·2H_2O$ were fully dissolved in 22 ml of deionized water. Then, the NiO sheet/NF prepared in step (1) was soaked in the resulting solution and stirred for 40 min. After stirring, the NiO sheet/NF was transferred into a stainless steel reactor, insulated at 165° C. for 7 h, cooled to room temperature and taken out. The NiO sheet/NF was soaked in deionized water and ultrasonically cleaned for 4 min. Then, the NiO sheet/NF was dried in a vacuum drying oven at a vacuum degree of −0.08 MPa and a temperature of 55° C. for 14 h, and taken out to obtain an NiO sheet@$CoMoO_4$ nanosheet/NF precursor. Then, the NiO sheet@$CoMoO_4$ nanosheet/NF precursor was placed in a quartz tube furnace, heated up to 420° C. at a heating rate of 0.6° C./min, and insulated for 2 h to obtain the NiO@$CoMoO_4$/NF electrode.

2. Preparation of a ductile material: 40 g of deionized water was heated to 55° C. 5 g of sodium carboxymethyl cellulose was added while stirring, dispersed uniformly and allowed to stand for 1.5 h to obtain a sodium carboxymethyl cellulose solution. Then, 5 g of carbon powder with a particle size of 10-50 μm and 1.2 g of iron powder with a particle size of 10-50 μm were added to the sodium carboxymethyl cellulose solution in sequence, stirred for 25 min and insulated for later use, the stirring speed being 40 r/min.

3. Treatment of the NiO@$CoMoO_4$/NF electrode: The NiO@$CoMoO_4$/NF electrode was soaked in the ductile material prepared in step 2, allowed to stand at 80° C. for 2.5 h, and then taken out and dried in a blast drying oven at 45° C. for 8 h.

4. Assembly of the supercapacitor: The NiO@$CoMoO_4$/NF treated with the ductile material, polypropylene and an activated carbon plate were cut in equal sizes of 1 cm*2 cm and then pressed together, and a KOH solution (6 mol/L) was used as the electrolyte to assemble the supercapacitor.
(1) Measurement of Mass Specific Capacitance The mass specific capacitance of the supercapacitor prepared in Comparative Experiment 3 was measured, and the results are as follows.

Figure 8:
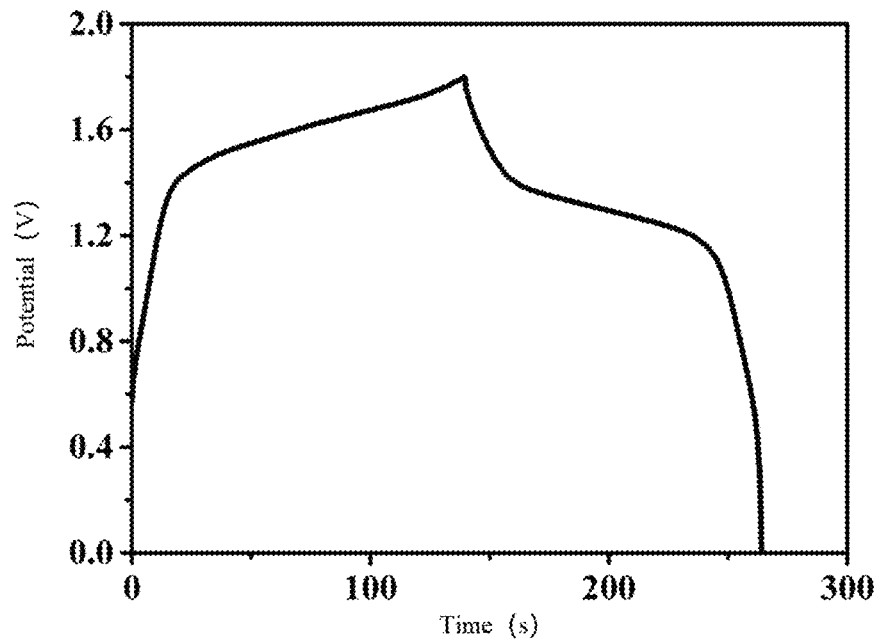
FIG. 8 is a map showing measurements of the mass specific capacitance of a product prepared in Example 4.

The experimental results show that the specific capacitance is as high as 69.1 F/g, the energy density is 31.1 Wh/kg, and the functional density is 900 W/kg. The specific results are shown in FIG. 8.

(2) Measurement of Cycling Stability of Charging and Discharging

Figure 9:
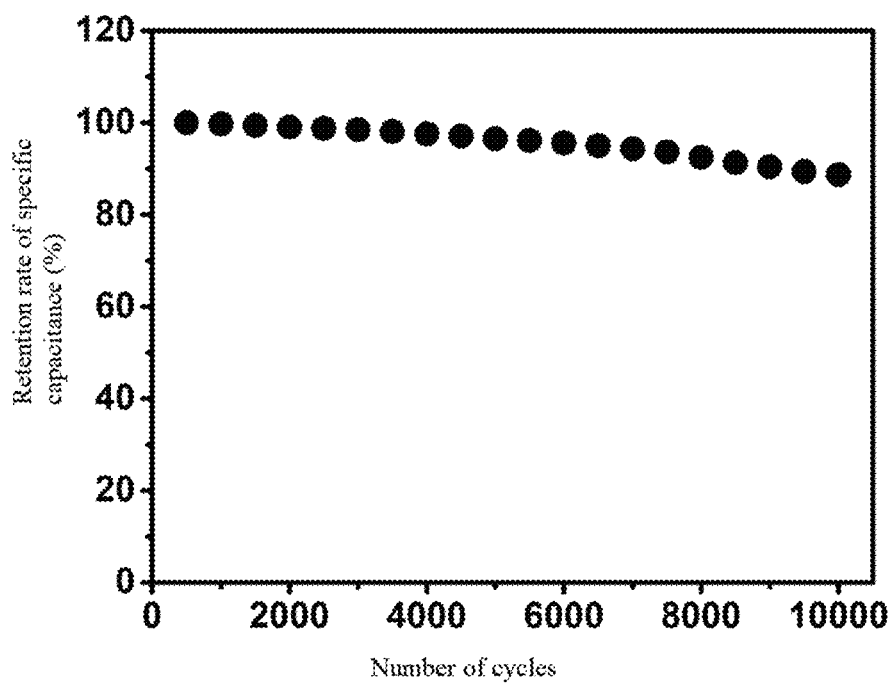
FIG. 9 is a map showing the cycling stability of charging and discharging of the product prepared in Example 4.

A 1 cm*1 cm electrode was prepared by cutting and charged and discharged for 10,000 cycles at a current density of 10 A/g. The specific capacity was recorded and calculated every 500 cycles, and the experimental results are shown in FIG. 9.

The experimental results show that after 10,000 cycles, the capacity of the present disclosure has not decayed and still maintains 88.7% of the maximum capacity.

Example 2

A supercapacitor with good cycling stability was prepared by the following steps.

1. Preparation of an NiO@$CoMoO_4$/NF electrode:
(1) NF (nickel foam, 1.5 cm*3.5 cm) was soaked in a hydrochloric acid solution (2.5 mol/L) for 5 min and then taken out. The NF was cleaned with deionized water to eliminate surface impurities, dried in an environment of 55° C. for 16 h, and then taken out. Then, the treated NF was soaked in deionized water and transferred into a stainless steel high-pressure reactor, the mass ratio of the NF (nickel foam) to the deionized water being 1:700). Then, the NF was insulated at a constant temperature of 140° C. for 28 h, cooled naturally to room temperature, and taken out. The NF was cleaned with deionized water 3 times, and dried in a vacuum drying oven at a vacuum degree of −0.05 MPa and a temperature of 65° C. for 20 h. After being dried, the NF was placed in a quartz tube furnace, heated up to 400° C. at a heating rate of 0.5° C./min, and insulated for 3 h to obtain NiO sheet/NF.

(2) 65.1 mg of $CoCl_2·6H_2O$ and 50.8 mg of $Na_2MoO_4·2H_2O$ were fully dissolved in 20 ml of deionized water. Then, the NiO sheet/NF prepared in step (1) was soaked in the resulting solution and stirred for 50 min. After stirring, the NiO sheet/NF was transferred into a stainless steel reactor, insulated at 160° C. for 8 h, cooled to room temperature and taken out. The NiO sheet/NF was soaked in deionized water and ultrasonically cleaned for 3 min. Then, the NiO sheet/NF was dried in a vacuum drying oven at a vacuum degree of −0.05 MPa and a temperature of 65° C. for 12 h, and taken out to obtain an NiO sheet@$CoMoO_4$ nanosheet/NF precursor. Then, the NiO sheet@$CoMoO_4$ nanosheet/NF precursor was placed in a quartz tube furnace, heated up to 400° C. at a heating rate of 0.5° C./min, and insulated for 2 h to obtain the NiO@$CoMoO_4$/NF electrode.

2. Preparation of a ductile material: 30 g of deionized water was heated to 50° C. 3 g of sodium carboxymethyl cellulose was added while stirring, dispersed uniformly and allowed to stand for 1 h to obtain a sodium carboxymethyl cellulose solution for later use. 20 g of styrene-butadiene rubber was heated to 70° C. The sodium carboxymethyl cellulose solution was added while stirring and stirred for 30 min. Then, 2 g of carbon powder with a particle size of 10-50 μm and 0.9 g of iron powder with a particle size of 10-50 μm were added in sequence, stirred for 20 min and insulated for later use, the stirring speed being 20 r/min.

3. Treatment of the NiO@$CoMoO_4$/NF electrode: The NiO@$CoMoO_4$/NF electrode was soaked in the ductile material prepared in step 2, allowed to stand at 70° C. for 2 h, and then taken out and dried in a blast drying oven at 40° C. for 10 h.

4. Assembly of the supercapacitor: The NiO@$CoMoO_4$/NF treated with the ductile material, polypropylene and an activated carbon plate were cut in equal sizes of 1 cm*2 cm and then pressed together, and a KOH solution (6 mol/L) was used as the electrolyte to assemble the supercapacitor.

Measurement of mass specific capacitance and measurement of cycling stability of charging and discharging were performed on the product prepared in Example 2 by the experimental method in Example 1. The measurement results show that the specific capacitance is as high as 79.1 F/g, the energy density is 35.2 Wh/kg, and after 10,000 cycles, the capacity of the product has not faded and still maintains 100% of the maximum capacitance.

Example 3

A supercapacitor with good cycling stability was prepared by the following steps.

1. Preparation of an NiO@$CoMoO_4$/NF electrode:

(1) NF (nickel foam, 1.5 cm*3.5 cm) was soaked in a hydrochloric acid solution (3.0 mol/L) for 10 min and then taken out. The NF was cleaned with deionized water to eliminate surface impurities, dried in an environment of 60° C. for 12 h, and then taken out. Then, the treated NF was soaked in deionized water and transferred into a stainless steel high-pressure reactor, the mass ratio of the NF (nickel foam) to the deionized water being 1:900. Then, the NF was insulated at a constant temperature of 150° C. for 24 h, cooled naturally to room temperature, and taken out. The NF was cleaned with deionized water 5 times, and dried in a vacuum drying oven at a vacuum degree of −0.08 MPa and a temperature of 55° C. for 20 h. After being dried, the NF was placed in a quartz tube furnace, heated up to 450° C. at a heating rate of 0.5° C./min, and insulated for 3 h to obtain NiO sheet/NF.

(2) 65.1 mg of $CoCl_2·6H_2O$ and 50.8 mg of $Na_2MoO_4·2H_2O$ were fully dissolved in 25 ml of deionized water. Then, the NiO sheet/NF prepared in step (1) was soaked in the resulting solution and stirred for 50 min. After stirring, the NiO sheet/NF was transferred into a stainless steel reactor, insulated at 170° C. for 6 h, cooled to room temperature and taken out. The NiO sheet/NF was soaked in deionized water and ultrasonically cleaned for 3 min. Then, the NiO sheet/NF was dried in a vacuum drying oven at a vacuum degree of −0.08 MPa and a temperature of 55° C. for 15 h, and taken out to obtain an NiO sheet@$CoMoO_4$ nanosheet/NF precursor. Then, the NiO sheet@$CoMoO_4$ nanosheet/NF precursor was placed in a quartz tube furnace, heated up to 420° C. at a heating rate of 0.5° C./min, and insulated for 2 h to obtain the NiO@$CoMoO_4$/NF electrode.

2. Preparation of a ductile material: 50 g of deionized water was heated to 60° C. 8 g of sodium carboxymethyl cellulose was added while stirring, dispersed uniformly and allowed to stand for 2 h to obtain a sodium carboxymethyl cellulose solution for later use. 28 g of styrene-butadiene rubber was heated to 90° C. The sodium carboxymethyl cellulose solution was added while stirring and stirred for 50 min. Then, 6 g of carbon powder with a particle size of 10-50 μm and 1.5 g of iron powder with a particle size of 10-50 μm were added in sequence, stirred for 30 min and insulated for later use, the stirring speed being 50 r/min.

3. Treatment of the NiO@$CoMoO_4$/NF electrode: The NiO@$CoMoO_4$/NF electrode was soaked in the ductile material prepared in step 2, allowed to stand at 90° C. for 3 h, and then taken out and dried in a blast drying oven at 45° C. for 8 h.

4. Assembly of the supercapacitor: The NiO@$CoMoO_4$/NF treated with the ductile material, polypropylene and an activated carbon plate were cut in equal sizes of 1 cm*2 cm and then pressed together, and a KOH solution (6 mol/L) was used as the electrolyte to assemble the supercapacitor.

Measurement of mass specific capacitance and measurement of cycling stability of charging and discharging are performed on the product prepared in Example 3 by the experimental method in Example 1. The measurement results show that the specific capacitance is as high as 78.8 F/g, the energy density is 36.2 Wh/kg, and after 10,000 cycles, the capacity of the product has not faded and still maintains 100% of the maximum capacitance.

What is claimed is:

1. A method for preparing a supercapacitor with good cycling stability, using NiO@$CoMoO_4$/NF, an activated carbon plate, 6 mol/L of a KOH solution, and a polypropylene as raw materials, and being implemented through preparation of an NiO@$CoMoO_4$/NF electrode and assembly of the supercapacitor, wherein the NiO@$CoMoO_4$/NF is an anode of the supercapacitor, the activated carbon plate is a cathode of the supercapacitor, the KOH solution is an electrolyte, the polypropylene is an isolation plate, and the NF in the _NiO@$CoMoO_4$/NF is a nickel foam;

the NiO@$CoMoO_4$/NF electrode is prepared by the following steps in the order:

(1) the NF is soaked in 2.5-3.0 mol/L of a hydrochloric acid solution for 5-10 min and then taken out; the NF is cleaned with a deionized water to eliminate surface impurities, dried in an environment of 55-60° C. for 12-16 hours, and then taken out; then, a treated NF is soaked in the deionized water and transferred into a stainless steel high-pressure reactor, a mass ratio of the NF to the deionized water being 1:700-900; then, the NF is insulated at a constant temperature of 140-150° C. for 24-28 hours, cooled naturally to a room temperature, and taken out; the NF is cleaned with the deionized water 3-5 times, and dried in a vacuum drying oven at a vacuum degree of −0.05 to −0.08 MPa and a temperature of 55-65° C. for 20-26 hours; and after being dried, the NF is placed in a quartz tube furnace, and heated up to 400-450° C. at a heating rate of 0.5-0.8° C./min, and insulated for 2-3 hours to obtain NiO sheet/NF, the NF being the nickel foam;

(2) 65.1 parts by mass of $CoCl_2 \cdot 6H_2O$ and 50.8 parts by mass of $Na_2MoO_4 \cdot 2H_2O$ are fully dissolved in 2000-2500 parts by mass of the deionized water; then, the NiO sheet/NF prepared in step (1) is soaked in a resulting solution and stirred for 30-50 min; after stirring, the NiO sheet/NF is transferred into a stainless steel reactor, and insulated at 160-170° C. for 6-8 hours, and cooled to room temperature and taken out; the NiO sheet/NF is soaked in the deionized water and ultrasonically cleaned for 3-5 min; then, the NiO sheet/NF is dried in a vacuum drying oven at a vacuum degree of −0.05 to −0.08 MPa and a temperature of 55-65° C. for 12-15 hours, and taken out to obtain an NiO sheet@$CoMoO_4$ nanosheet/NF precursor; then, the NiO sheet@$CoMoO_4$ nanosheet/NF precursor is placed in a quartz tube furnace, heated up to 400-420° C. at a heating rate of 0.5-0.8° C./min, and insulated for 2 hours to obtain the NiO@$CoMoO_4$/NF electrode; and the NiO@$CoMoO_4$/NF electrode is further soaked in a ductile material, wherein the ductile material is composed of a carbon powder, sodium carboxymethyl cellulose, styrene-butadiene rubber, a metal powder and deionized water in a mass ratio of 2-6:3-8:20-28:0.9-1.5:30-50, a particle size of the carbon powder is 10-50 μm, and a metal powder is an iron powder or a copper powder, with a particle size of 10-50 μm.

2. The method for preparing a supercapacitor with good cycling stability according to claim 1, wherein the ductile material is prepared by the following steps: the deionized water is heated to 50-60° C.; the sodium carboxymethyl cellulose is added to the deionized water and stir them, dispersed uniformly and allowed to stand for 1-2 hours to obtain a sodium carboxymethyl cellulose solution for later use; the styrene-butadiene rubber is heated to 70-90° C.; the styrene-butadiene rubber is added to the sodium carboxymethyl cellulose solution and stirred for 30-50 min; and the carbon powder and the iron powder are added to the sodium carboxymethyl cellulose solution in sequence and stirred for 20-30 min and insulated, a stirring speed being 20-50 r/min.

\* \* \* \* \*